United States Patent [19]

Castel

[11] Patent Number: 5,067,429

[45] Date of Patent: Nov. 26, 1991

[54] METHOD FOR MOORING AND CONNECTING AN END OF A FLEXIBLE LINE WITH A CONDUIT OF A FLOATING OFFSHORE EDIFICE

[75] Inventor: Yvon Castel, Croissy sur Seine, France

[73] Assignee: Institut Francais Du Petrole, Rueil-Malmaison, France

[21] Appl. No.: 410,899

[22] Filed: Sep. 22, 1989

[30] Foreign Application Priority Data

Sep. 22, 1988 [FR] France .................................. 88 12405

[51] Int. Cl.$^5$ .................................................. F16L 1/00
[52] U.S. Cl. .......................................... 114/230; 441/2; 166/341; 166/343
[58] Field of Search ............... 114/230, 264, 266, 267, 114/312, 313, 322, 325; 405/224; 441/1-5; 166/338-345, 347, 349, 351, 352

[56] References Cited

U.S. PATENT DOCUMENTS

| | | | |
|---|---|---|---|
| 4,490,073 | 12/1984 | Lawson | 405/169 |
| 4,620,818 | 11/1986 | Langner | 166/343 |
| 4,637,335 | 1/1987 | Pollack | 114/230 |
| 4,797,029 | 1/1989 | Cowan | 166/341 |
| 4,848,949 | 7/1989 | Castel | 166/341 |
| 4,892,495 | 1/1990 | Svensen | 114/230 |

Primary Examiner—Sherman Basinger
Assistant Examiner—Clifford T. Bartz
Attorney, Agent, or Firm—Antonelli, Terry, Stout & Kraus

[57] ABSTRACT

A method for mooring and connecting at least one flexible line end with a conduit of a floating sea edifice, with the method including the steps of mooring a harpoon to a float, which harpoon is attached to a first cable, pulling on the first cable to bring the float toward a support integral with the edifice, mooring the float to the support, and, with an arm fixed to the flexible line end and attached to the second cable, bringing the arm and the flexible line by the second cable and/or positioning in a position permitting connection with the conduit. The conduit is placed in a vicinity of the flexible line end, and the conduit and flexible line end are assembled and connected together, with the flexible line end being connected to the float.

9 Claims, 8 Drawing Sheets

METHOD FOR MOORING AND CONNECTING AN END OF A FLEXIBLE LINE WITH A CONDUIT OF A FLOATING OFFSHORE EDIFICE

BACKGROUND OF THE INVENTION

1. Field of the Invention

The present invention relates to a method for mooring and connecting a set of flexible lines on a surface edifice such as a barge, with the method making it possible to cast off the flexible lines from the surface edifice.

This invention may in particular be applied to the field of oil effluents production, in polar seas in regions through which icebergs pass which are likely to strike surface edifices or in regions in which the weather conditions are very severe (wind of 150 km/h, waves reaching 30 m). When an edifice coupled to a bottom base by flexible lines needs to be rapidly evacuated from a critical zone, the evacuation takes place by leaving the flexible lines and the bottom equipment in place.

2. Description of the Prior Art

The French patent 2 600 710 describes a device for positioning and removing a set of flexible lines connecting a surface platform with an underwater base which can be used in polar seas. In this document, the flexible lines remain fixed to the platform when it is desired to move the platform in an emergency, disconnection to the lines taking place at their ends the furthest away from the platform. Such an arrangement has the particular disadvantage that the positioning or disconnecting of the lines is time-consuming and delicate, because of the hostility of the aquatic depths of the polar seas.

SUMMARY OF THE INVENTION

The present invention provides a new method of mooring and connecting at least one flexible line end with a conduit of an edifice disposed at the surface of an aquatic medium and casting off of the flexible line. The method comprises the steps of mooring a harpoon to a float, with the harpoon being attached to a first cable, pulling on the first cable in order to bring the float toward the support integral with the edifice, mooring the float to the support, and, with an arm fixed to the flexible line end and attached to the second cable, bringing the arm and flexible line by using this second cable, and/or positioning in a position permitting a connection with the conduit. The conduit is placed in a vicinity of a flexible line end, and the conduit and flexible line end are assembled together, with the line end being connected to the float.

By virtue of the features of the present invention, the surface connection of the lines is very easily carried out and operations for casting off the lines is rapid and, for example, may take less than an hour, and even more rapidly if the flexible lines are not drained and rinsed before disconnection.

The float may be positioned relatively to the support. For this at least one trim of the float may be adjusted.

For positioning and/or centering the float with the support, the edifice can also be moved relatively to the aquatic medium.

For positioning the float relatively to the support, it is also possible to moor a second harpoon to the float, at a distance from the first harpoon sufficient for facilitating angular positioning of the float relative to the support, the second harpoon being attached to a third cable, the first and second harpoons may be equipped with means providing positioning between the float and the support, and a pull may be exerted substantially simultaneously on the first and third cables for bringing the float towards the support which is fast with the edifice and positioning the float relatively to the support.

The arm may be indexed for rotation so as to facilitate the positioning of the end of the flexible line for connection with the conduit.

In order to enable a casting off of the flexible line and the float in the aquatic medium, the conduit is released from the flexible line end and the float is unmoored from the support.

The harpoon may be unmoored from the float once the float has been moored to the support.

When several flexible lines as associated with the same float and the same support, in order to enable a simultaneous casting off of the flexible lines each connected to a conduit, the end of each of the flexible lines is first released from the conduit prior to the unmooring of the float from the support.

The invention further provides a device for mooring at least one flexible line end with a conduit of an edifice disposed at the surface of an aquatic medium. This device is characterized in that it comprises a float, a support fast with the edifice, a first means for drawing the float nearer, such as a harpoon, adapted to cooperate with the float so as to draw together the float and the support, means for mooring the float to the support, means for mooring the flexible line end to the float, means for positioning the flexible line end in a position permitting connection with the conduit, and means for connecting the flexible line end with the conduit.

The float, the drawing together means and the support may comprise means for centering the float with respect to the support providing both centering of the float with the drawing together means and centering of the support with the drawing together means.

The float may comprise means for adjusting at least one trim of the float adapted for facilitating centering between the float and the support.

The device may comprise means for positioning said support and the float.

The device may comprise means for drawing together and positioning the flexible line end with respect to the conduit.

The means for drawing together and positioning the flexible line end relatively to the conduit may comprise an arm fixed laterally to the line end, the arm comprising centering and positioning means adapted for cooperating with centering and positioning means integral with the float, these means being adapted for centering the line end with the conduit.

The device may comprise a second means for drawing the float nearer, adapted for cooperating with the float and the support, and said first and second drawing together means may comprise means adapted for positioning the float relatively to the support.

The device may comprise damping means adapted for damping the fall of the end of the line when the line is disconnected from the conduit.

The float may comprise a projection for passage of the arm of the line end for connection thereof with the conduit and the damping means may comprise a damping element fast with the float and cooperating with a retractable stop fixed to the arm for damping the fall of the line.

The flexible line end may be fixed to the arm by means of at least one thrust bearing.

BRIEF DESCRIPTION OF THE DRAWINGS

The invention will be better understood and its advantages will be clear from the following description of different embodiments illustrated by the accompanying drawings wherein.

DESCRIPTION OF THE PREFERRED EMBODIMENTS

Figure 1:
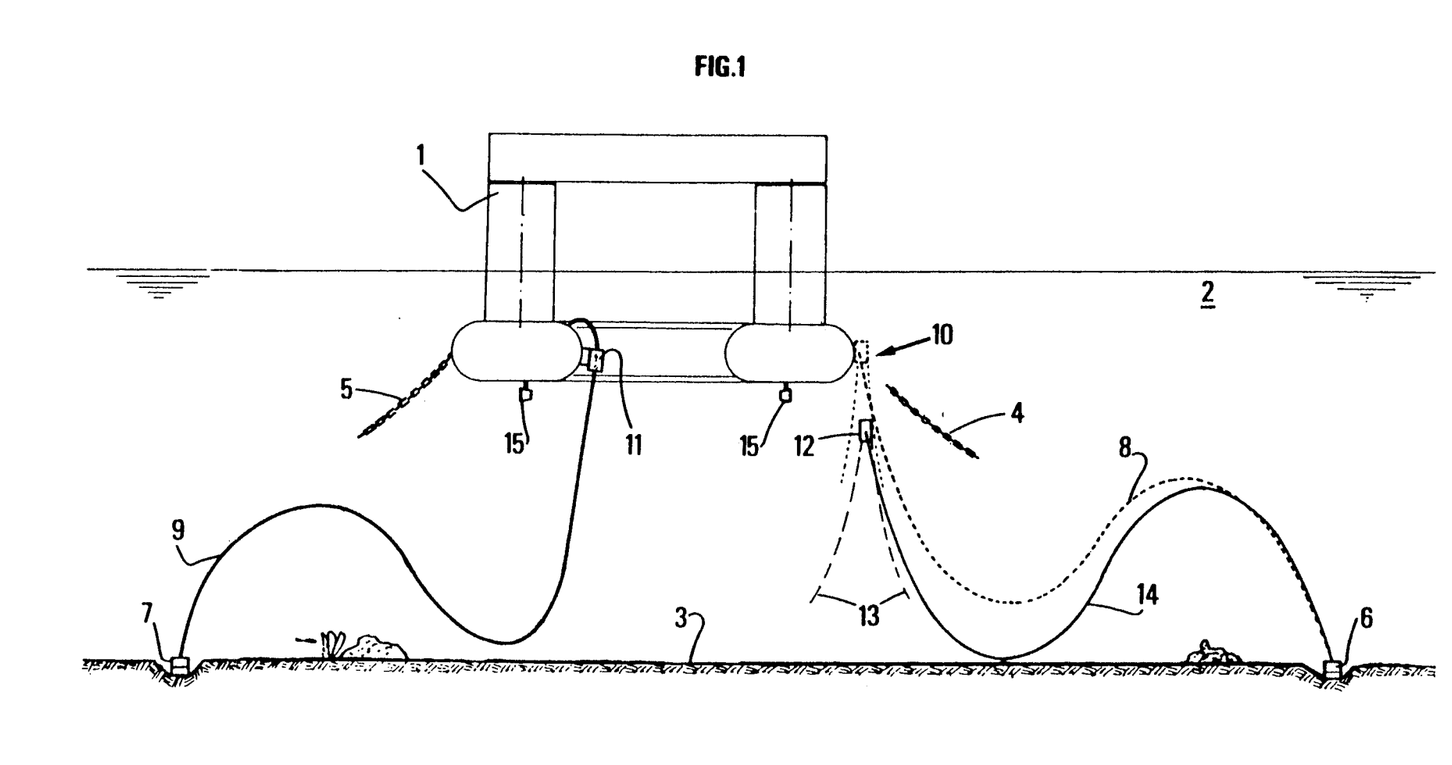
FIG. 1 shows schematically two ways of mounting the device of the invention on an oil production platform.

FIG. 1 shows schematically a pontoon 1 or floating platform in an aquatic medium 2 such a polar sea. This pontoon 1 is moored to the sea bed 3 by chains 4, 5 for stabilizing it while permitting slight vertical or horizontal movements generated, for example, by the swell, the tide or the current. The water depth is for example 80 to 100 meters in Arctic seas. In the sea bed 3 are buried two bases 6 and 7 each connected, by a set of flexible, lines 8 and 9, to undersea oil-wells and/or to an undersea oil network, and connected to platform 1. In FIG. 1, the set of flexible lines 8 is moored on board the platform by the device of the invention referenced 10 as a whole, whereas the set of flexible lines 9 is moored inside the platform by a device 11 similar to the preceding device 10.

According of the invention, the device for mooring the flexible line ends makes it possible to cast off the lines particularly when the platform is to be moved from the production location. When the set 8 of flexible lines is cast off, a portion 12 of the device 10 of the invention comprising a float and connected to the lines 8 sinks in the aquatic medium 2 to a certain depth defined by weighted chains 13 called "hangers" which exert a tractive force on float 11. This tractive force decreases with the depth of immersion of the float and is adjusted so as to obtain a balance of the forces exerted on the float (Archimede's thrust, weight, ...) and those produced at the level of the float by the hangers. Once cast off, the lines assume a profile designated by the line referenced 14.

The pontoon 1 may then move by means of propellers 15.

Figure 2:
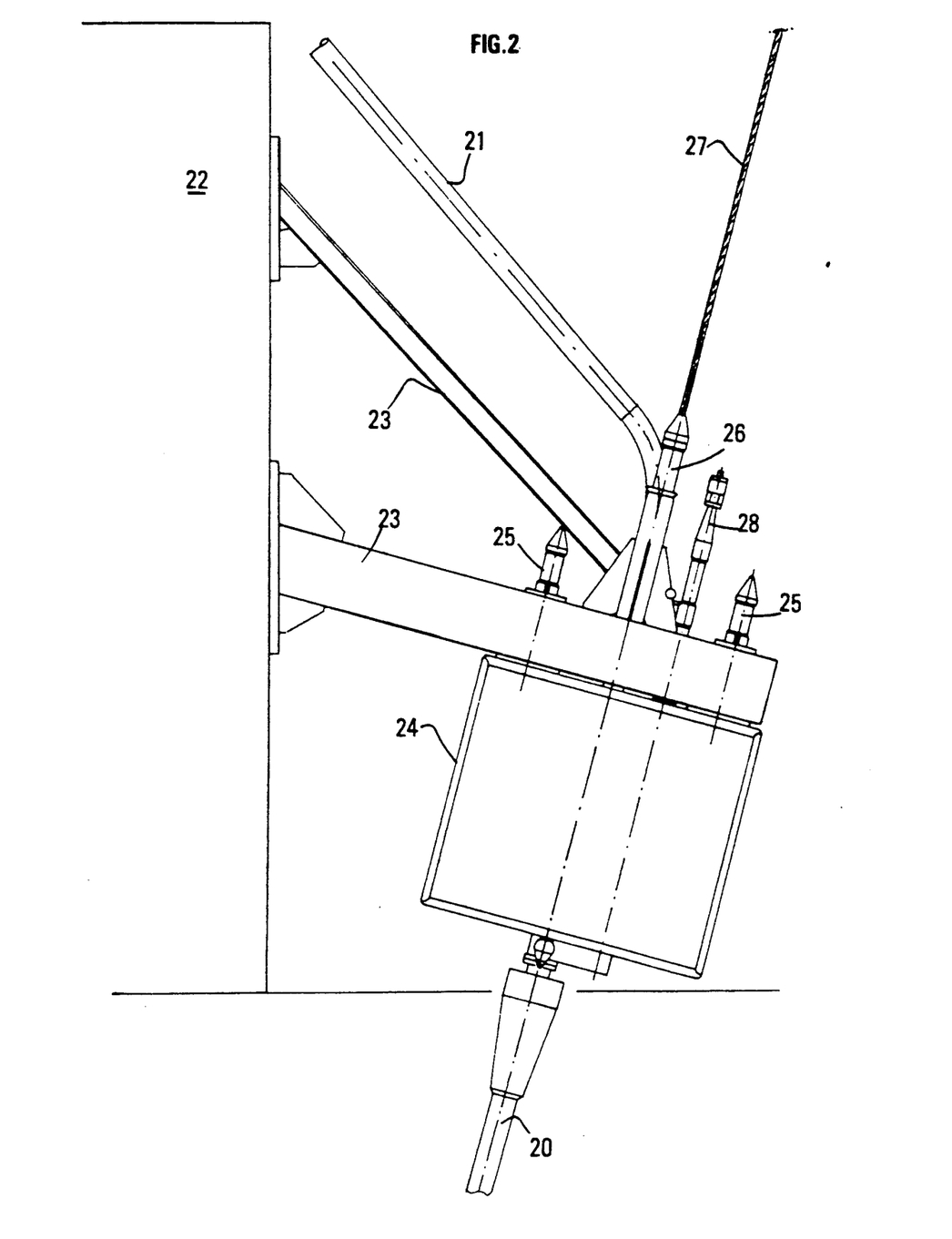
FIG. 2 shows a side view of the assembled device of the invention.

FIG. 2 is a side view of the device of the invention installed inside a pontoon, such as device 11 and pontoon 1 of FIG. 1. According to the invention, the device makes it possible to moor and connect the end of a flexible line 20 with a conduit 21 attached to the pontoon 22. The device is held in position on pontoon 22 by a support 23. A float 24 is traversed by the end of flexible line 20. Float 24 is positioned with respect to support 23 by means of four guide posts 25 cooperating with sleeves disposed in pairs at each of the ends of the device.

A harpoon 26 placed at each of the ends of the device (FIG. 3) permits centering of the float 24 in the support 23. The harpoon 26 is connected by a cable 27 to winches of the pontoon.

Figure 3:
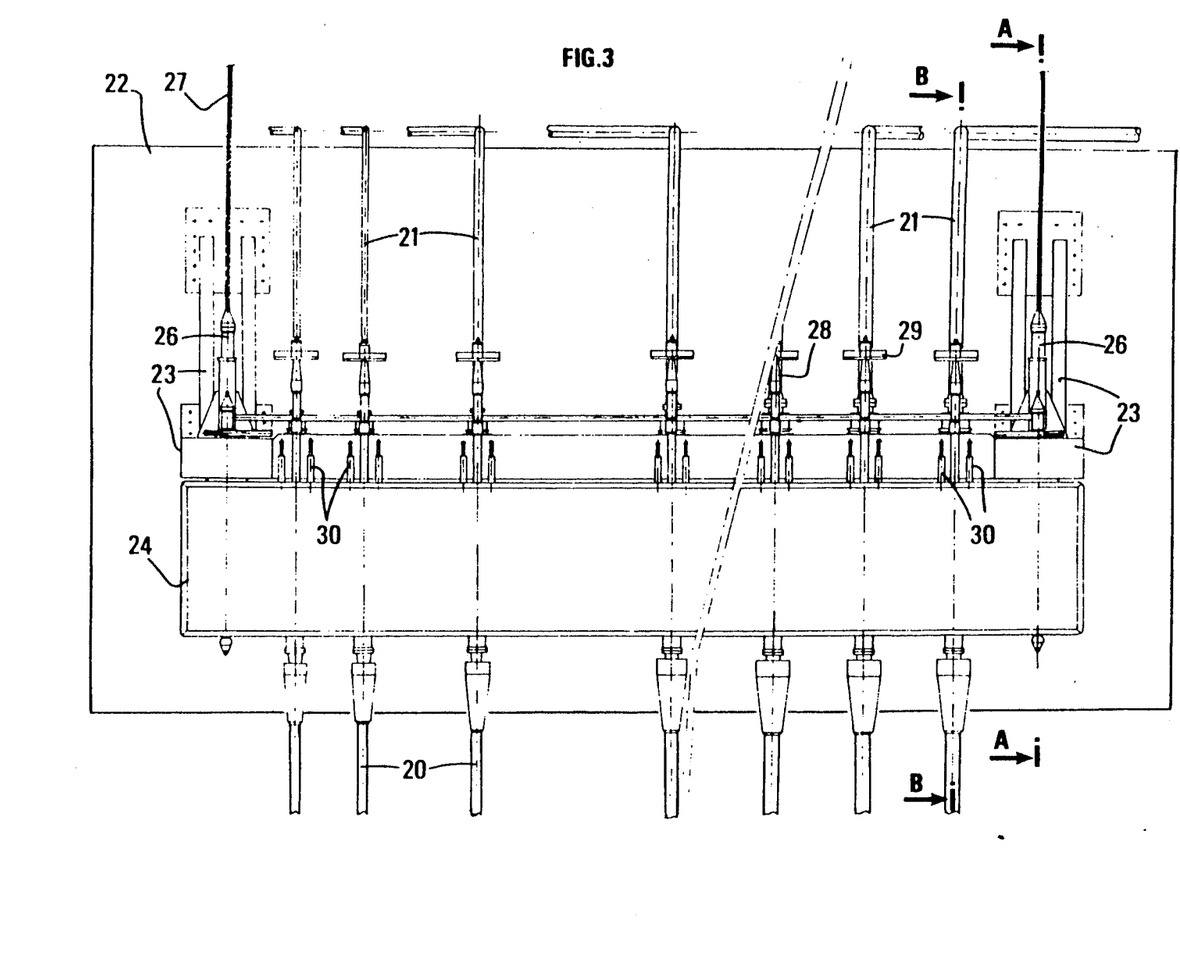
FIG. 3 shows a front view of the device of the invention illustrating the connection of a bundle of flexible lines.

FIG. 3 is a front view of the device of the invention for mooring and connecting several flexible line ends disposed between two platforms. Each of the ends of the lines is fixed laterally to an arm 28 equipped with a retractable stop 29 which cooperates with two dampers 30 fast with float 24 for damping the fall or sudden descent of the end of line 20 when line 20 is disconnected from conduit 21. These dampers 30 are disposed each on one side of arm 28.

Figure 4:
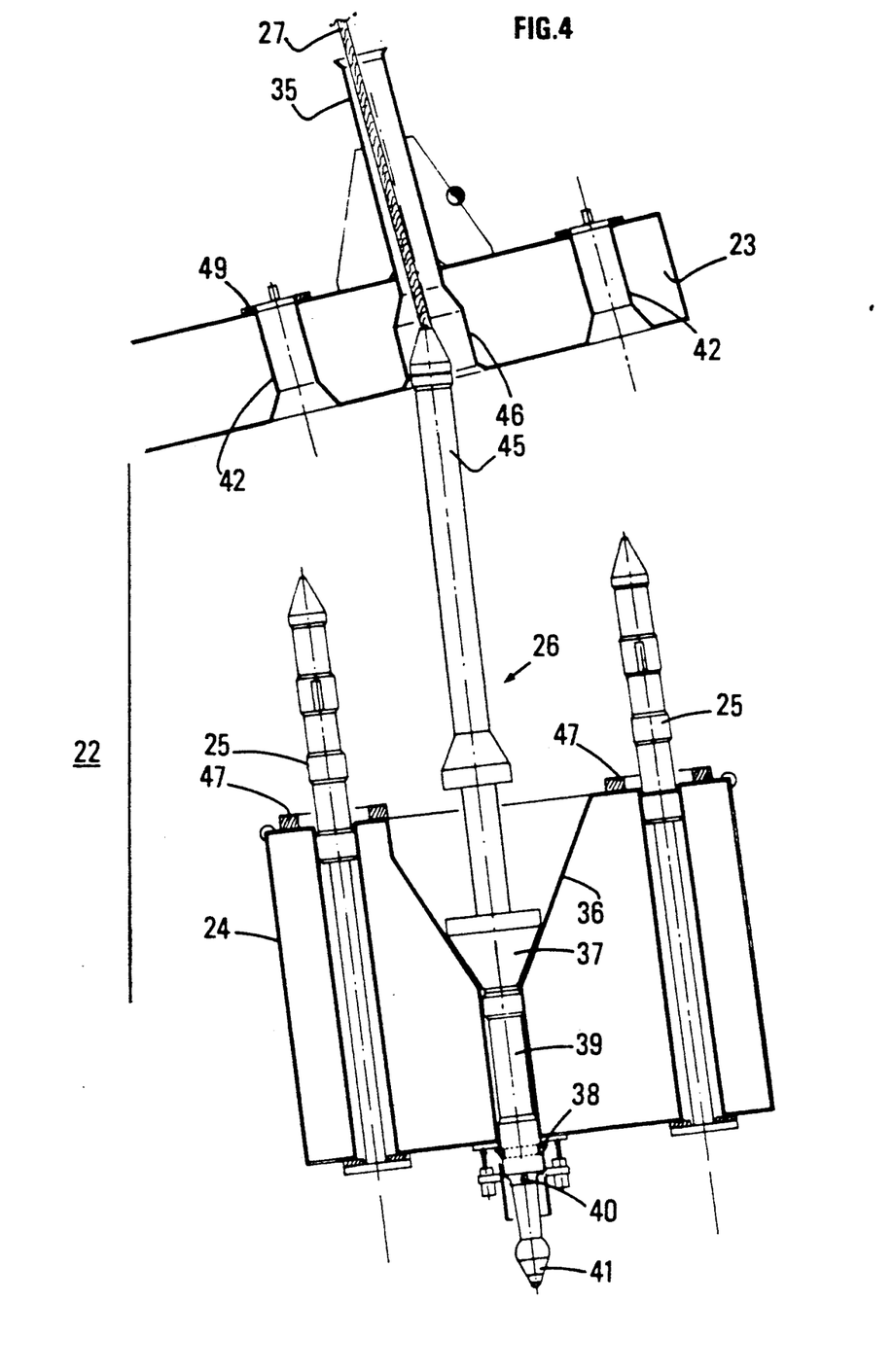
FIG. 4 illustrates, in a side view, a step for assembling the device of the invention, by means of a harpoon.
Figure 5:
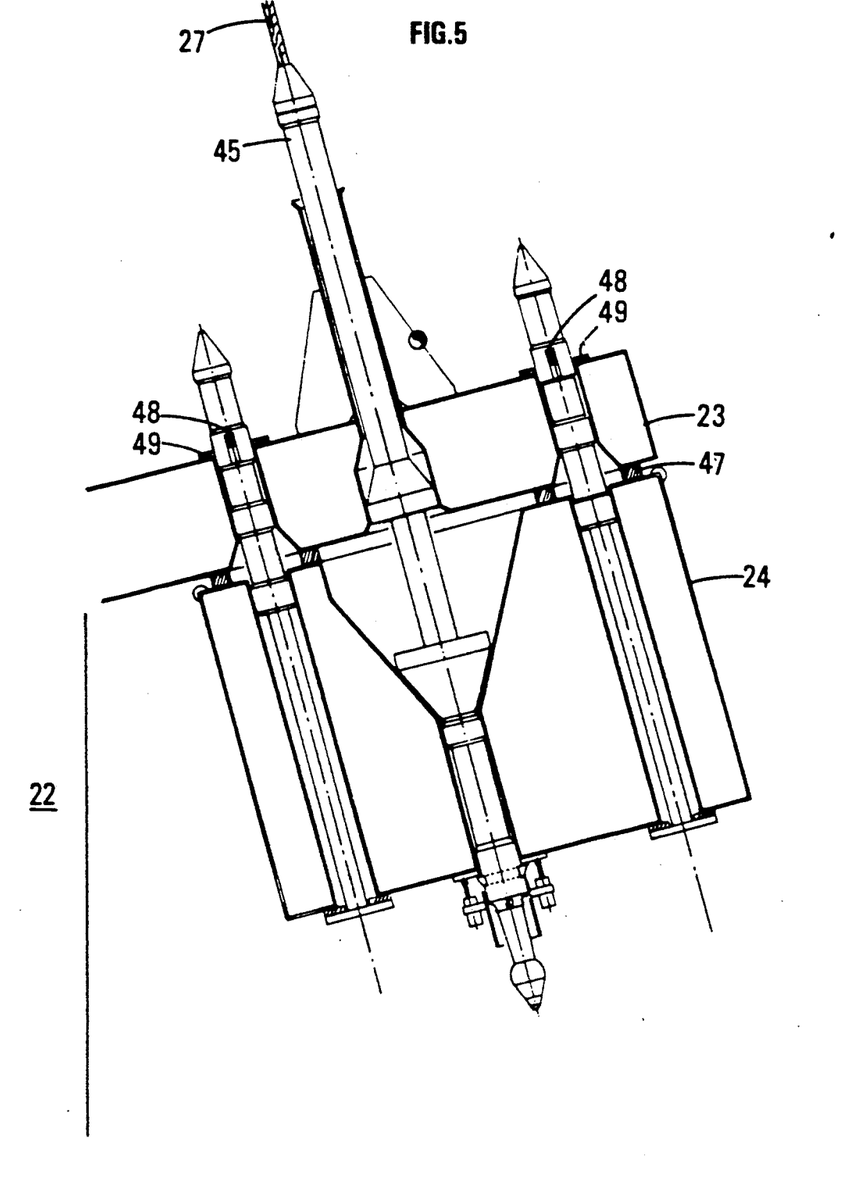
FIG. 5 shows a section of the device of the invention once assembled.
Figure 6:
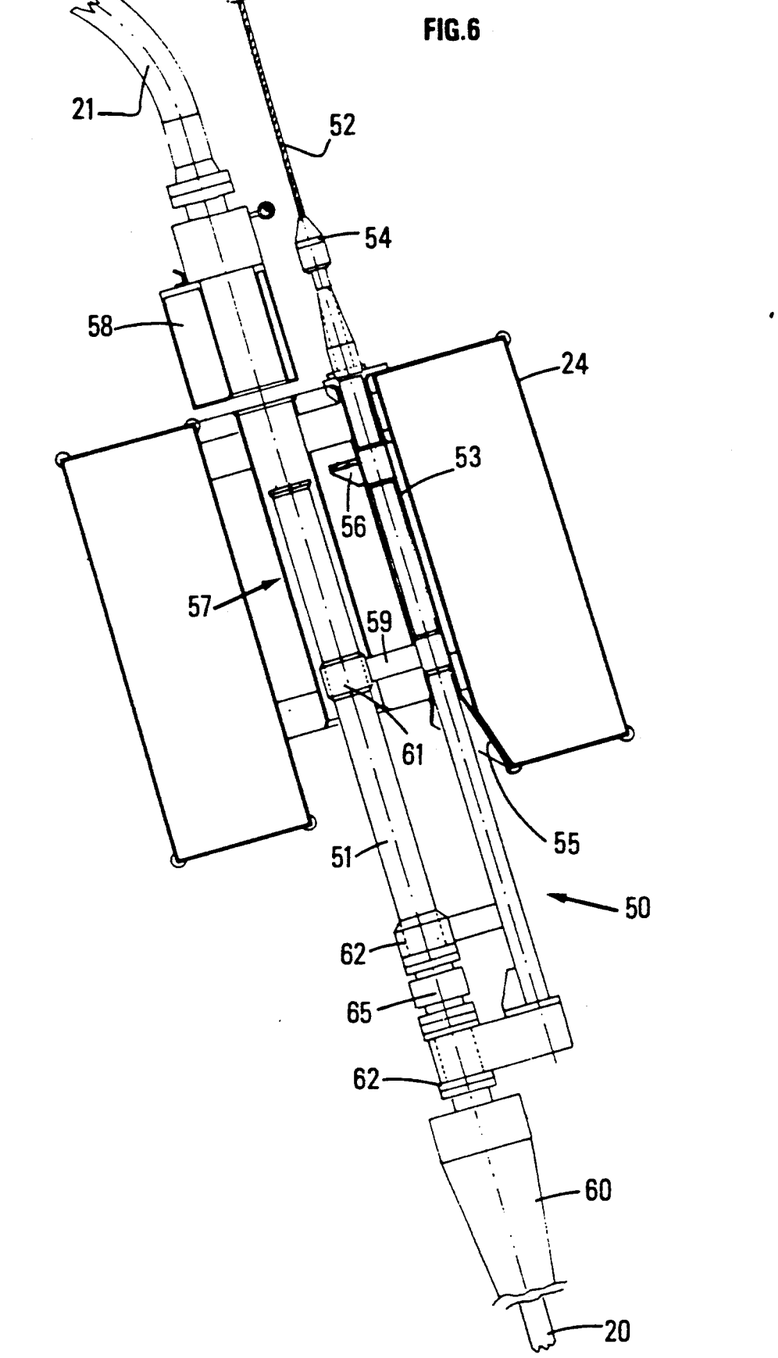
FIG. 6 shows a preliminary step for connecting between a conduit and a flexible line.
Figure 7:
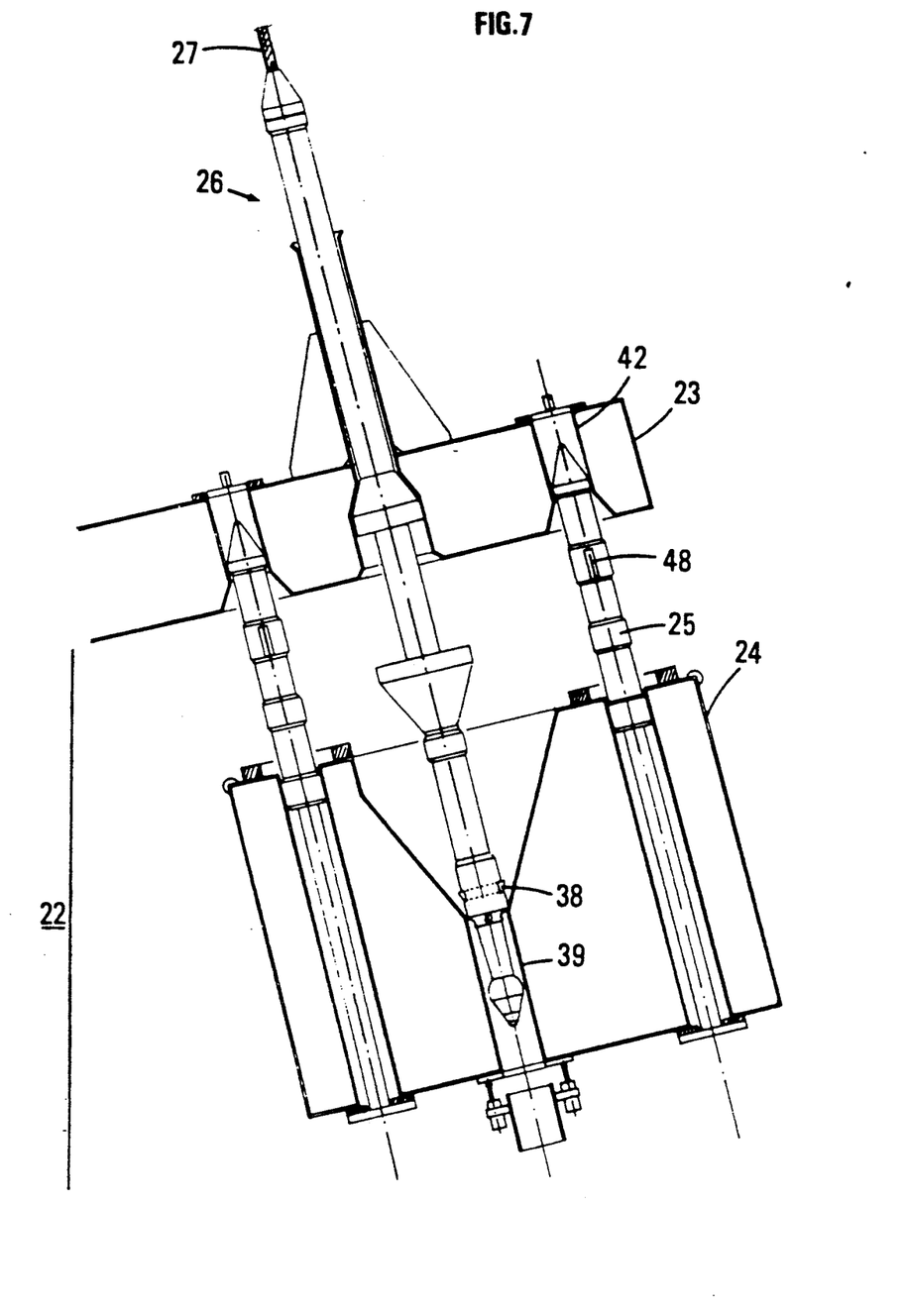
FIG. 7 illustrates the device of the invention during release of the float.

FIGS. 4 to 7 illustrates four steps of the method for mooring, connecting and casting off in accordance with the invention which is explained in detail hereafter. FIGS. 4, 5 and 7 are sections of the device through plane A defined in FIG. 3, whereas FIG. 6 is a section of the device through plane B defined in FIG. 3.

To put the method of the invention into practice, support 23 is fixed to the side of pontoon 22. Support 23 is raised on the side of the pontoon opposite the side in contact with the pontoon so that the position of the flexible lines is correct at the level of the support and thus the flexible lines work in better conditions. The slant angle of support 23 has been calculated in particular so that the flexible lines have the shape of a horizontal S between the pontoon and the sea bottom, and so that the lines do not strike the pontoon during operation or during movement of the pontoon while it is anchored. This slant angle also depends on the relative position of the support and of the base disposed on the sea-bed.

Initially, the float 24 is in the water. To moor the float 24 to support 23, harpoon 26 is used. This harpoon 26 is attached to a first cable 27 which passes through support 23 from one side to the other at the level of a tube 35. The harpoon is lowered vertically into the water until it penetrates an entrance cone 36 formed in the upper face of float 24. A tapered stop 37 fixed to harpoon 26 limits penetration of the harpoon into the entrance cone 36 and positions the harpoon in depth, so that the means 38 for mooring the harpoon 26 with float 23 may be brought into action. These mooring means 38 comprise retractable dogs integral with the harpoon which cooperate with a plate integral with the float and make it possible to bring the float closer to the support. The entrance cone 36 is extended by a tube 39 cooperating with the harpoon for centering the harpoon 26 relatively to the float.

The lower end of the harpoon comprises cameras 40 for observing the penetration of harpoon 26 into cone 36. The harpoon 26 also comprises a pointed tip 41 assisting centering of the harpoon with the float.

Once the harpoon 26 is engaged with the float 24, the float is brought close to the support by pulling the first cable 27 until the position illustrated in FIG. 4 is obtained, in which the upper end 45 of the harpoon penetrates into a recess 46 in support 23, then into said tube 35. This operation of mooring the harpoon with the float and pulling the first cable is carried out substantially simultaneously for each of the harpoons of the device.

To facilitate centering of float 24 with support 23, the different ballast reservoirs of the float are adjusted, so as to modify the longitudinal and transverse trims of the float. The longitudinal trim corresponds to the position of the float which is seen, in the front view (FIG. 3), between the level of the sea and the longitudinal axis of the float.

The transverse trim corresponds to the position of the float which can be seen, in a side view or cross section of the float (FIG. 4) between the vertical and the axis of the harpoon or the vertical axis of the float.

Such trim adjustment is obtained either directly by divers operating the ballast reservoir valves or remotely if the pontoon has been previously connected by an umbilical line to the float and to the ballast reservoirs. The trim of the float may also be adjusted by modifying the length and/or the tension of the weighted chains 13 or by moving pontoon 22 relatively to the float, cables 27 providing connection with the platform.

By further pulling each of cables 37, the guide posts 25 penetrate into bores 42 so as to provide correct positioning of float 24 with support 23.

The approach of float 24 towards support 23 is limited by resilient annular wedges 47 inserted therebetween so as to eliminate the noises generated by the movements of the float relatively to the support and which would be transmitted into the pontoon if these wedges did not exist.

With the float 24 and support 23 assembled together, they are locked together by means of dogs 48, disposed in the guide posts 25, which cooperate with a stop 49 fixed to support 23 about the upper end of each of the bores 42. FIG. 5 shows a section of the device in the position thus obtained, before the pulling force on the first cable 27 is relaxed.

Then the ends of the flexible lines 20 are positioned. For this, each end is provided with an arm 50 fixed laterally to a tube 51 extending line 20. A bearing surface 61 and two thrust bearings 62 are provided. Bearing surface 61 and the two thrust bearings make it possible for the end 20 of the flexible line to rotate with respect to arm 50 and thus prevent the flexible line from striking the other lines because of kinking, or undergoing residual destructive twisting at the time of positioning.

A second cable 52 is inserted in the centering tube 53 of arm 50 which passes through float 24 and the free end of this second cable 52 is fixed to the end of arm 50, for example by means of divers, the end of the arm comprising a rotary attachment 54 for avoiding twisting of line 20 and cable 52. By pulling the second cable 52, the end of arm 50 is brought towards a skewed centering cone 55 terminating the lower portion of tube 53. The skew of the cone cooperates with a fool-proof device 56 fixed to arm 50 for positioning the end of the extension tube 50 opposite the split well 57 of float 24. With the pulling force continuing to be exerted on cable 52, the foolproof device 56 slides in a slit of the centering tube 53 and the end of the extension tube 51 penetrates into connector 58 of conduit 21 attached to the pontoon as far as its position making connection possible.

Connector 58 is then locked.

Then the portion of arm 50 projecting from float 24 is equipped with a retractable stop 29 (FIG. 3) adapted for cooperating with the dampers 30 (FIG. 3) fixed to float 24, the second cable 52 is disconnected from arm 50 and conduit 21 is pressurized to test the connection.

The slit in well 57 is disposed opposite tube 53 so that the strengthening rib 59 between arm 50 and the extension tube 51 does not prevent assembly of conduit 21 with the end of the extension tube.

The flexible line 20 comprises a stiffener 60 at the level of its connection with the extension tube 51 and a valve 65 for isolating the flexible line disposed between two thrust bearings 62.

The operations for positioning the flexible lines are carried out for each of the lines to be connected to the pontoon. These lines may be lines for injecting chemical products, for testing, for injecting gas, for injecting water, for injecting steam, for effluent production, or else "umbilicals", for controlling the underwater bases 6, 7 (FIG. 1), underwater wells or ballast reservoirs for float 24.

The umbilical lines or "umbilicals" each comprise several fluid and electric conduits. The different conduits of an umbilical line are identified after each new connection, for the connector does not comprise a single indexation but a sectorial indexation which leads to connections permuting circularly the fluid conduits on the one hand and the electric conduits on the other, the umbilical being capable of rotating in arm 50 because of the thrust bearing 62 and bearing surface 61.

To make fifteen or so connections to a pontoon or a production platform, the length of the device is about forty meters.

FIG. 7 illustrates the operation for casting off the lines. When it is desired to separate the set of lines from the pontoon, the different flexible lines are drained (if time allows), then they are unlocked.

The lines then drop towards the float, their fall being damped by stop 29 and dampers 30 (FIG. 2) while remaining secured to float 24. Then, the set of dogs 48 of the four guide posts 25 and the dogs 38 of the two harpoons 26 are unlocked. As soon as that happens, the float falls first of all while being guided with the harpons 26, the guide posts 25, the entrance cone extension tubes 36 and bores 42, then falls freely to the depth defined by the "hangers" 13 (FIG. 1), for example fifty meters or so under the surface of the water.

The pontoon or the platform may then cast off its stabilizing and anchorage chains 50 and move with its propellers 15.

Before casting off chains 5, chains 5 are equipped with buoys and markers facilitating location and recovery thereof.

To reconnect the lines to the conduits, the pontoon is moored first of all to chains 5, then the two harpoons are sent to fish up the float 24 as described above. The float 24 is assembled and secured with support 23 and to each of arms 28 is fixed their second respect cable 52. Conduit 21 and the end of flexible line 20 are assembled together before locking each of the connectors 58 and testing each of the connections.

To facilitate this connection, the ballast reservoirs and propellers 15 may be used for slightly manoeuvring the pontoon relatively to the float. Propellers 15 may also be used during the initial positioning of float 24 with support 23. As before, the tension and/or position of the weighted chains 13 may be adjusted in order to modify the trims of float 24.

Figures 8, 9:
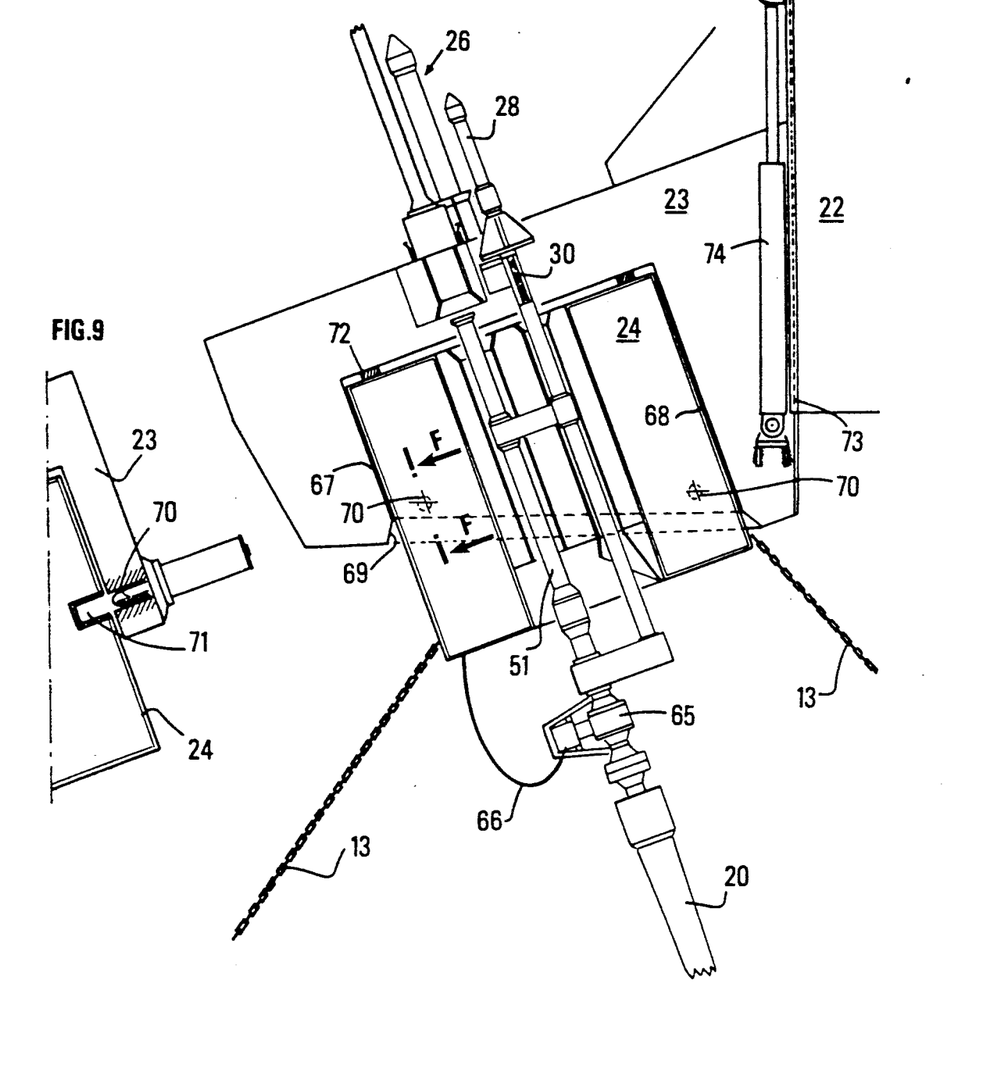
FIG. 8 is a variant of the device of the invention shown in cross section in line with a flexible line.
FIG. 9 shows a local longitudinal section of the device illustrated in section in FIG. 8.

FIG. 8 shows a cross section of a variant of the device of the invention, at the level of a flexible line.

This variant of the device is distinguished in particular from the device illustrated in FIGS. 2 to 7 in that it comprises no guide post 25 and no centering bore 42, and no dogs 48 on these posts, but support 23 comprises in particular a housing for positioning the float 24 in support 23 through the cooperation of the front and rear surfaces of the float with the sidewalls 67, 68 of the housing. The positioning of float 24 in support 23 is facilitated by a bell-mouth portion 69 at the entrance to the housing. The support further comprises two pairs of dogs 70 laterally of float 24 and penetrating into cavities 71 of float 24 for locking the float with the support.

In this variant shown in FIG. 8, the resilient annular wedges 47 of FIGS. 4 and 5 have been replaced by resilient pads 72, made from elastomer, longitudinally of the float and providing the same effect as wedges 47.

In addition, support 23 has been mounted on slides cooperating with other vertical slides integral with the pontoon. The assembly of slides is referenced 73. The movement of the support relatively to the pontoon 22 is obtained by jack 74 whose rod is fixed to the pontoon 22 and body to support 23. The vertical movement of the support is used at the time of bringing the pontoon into service. In fact, since in service the bottom of the support is disposed below the bottom of the pontoon and since during construction the pontoon rests on its bottom, the existence of a support lower (by about 10 meters) than the bottom of the pontoon leads to manufacturing complications. For that reason, the support is therefore raised during construction of the pontoon, and lowered when it is in service.

FIG. 8 further shows the existence of a valve 65 disposed between the flexible line 20 and its extension tube 51. This valve 65 makes it possible to isolate line 20 particularly during connecting and disconnecting operations. Valve 65 is controlled through a control line 66 connected to support 24 itself connected to pontoon 22 by another line not shown.

The variant of the device is used in the same way as for the device itself. The float is centered with the support by means of the two harpoons 26. Positioning of the float with the support is provided by the sidewalls 67, 68 of the recess of the support cooperating with the front and rear faces of the float. Locking of the support occurs through cooperation of the lateral dogs 70 with the cavities 71 (FIG. 9).

Generally, without departing from the scope of the invention, it may be considered that the invention, which applies to a pontoon, also applies to any edifice disposed at the surface of an aquatic medium, that the two harpoons are replaceable by any other drawing together means, that dogs 48 and the locking stop 49 or dogs 70 and recesses 71 form means for mooring the float to the support, that the connector 58 forms mooring means at the end of a line, that the centering tube 53, arm 50, the skewed centering cone 53 and the fool-proof device 56 form means for positioning and centering the end of line 20 in a position permitting connection with conduit 21, that the ballast reservoirs of the float form means for adjusting the trims of the float, that the ends of the lines pass through the float through a projection, this projection comprising a well 51 and a centering tube 53, that the means for centering the float with the support comprise the harpoon 26, the extension tube 39 and the entrance cone 36, the end 45 of the harpoon, the bell-mouth portion 46 and tube 35. Centering and positioning of the flexible line relatively to conduit 21 may also be achieved by fixing the centering and positioning means to support 23.

What is claimed is:

1. A method of mooring and connecting at least one flexible line end connected with a bottom base with a conduit of an edifice disposed at a surface of an aquatic medium, said bottom base being adapted to be utilized for oil effluent production, the method comprising the steps of:
    mooring a harpoon attached to a first cable to a float,
    pulling the first cable to bring said float toward a support integral with said edifice,
    mooring said float to said support,
    fixing an arm to an end of said flexible line and attaching the flexible line to a second cable,
    at least one of bringing and positioning said flexible line using said second cable to a position for permitting a connection with said conduit,
    placing said conduit in a vicinity of said end of said flexible line,
    assembling and connecting said conduit and said end of said flexible line together, and
    connecting said end of said flexible line to said float.

2. The method as claimed in claim 1, further comprising a positioning of the float relative to said support.

3. The method as claimed in claim 2, wherein the step of positioning said float includes adjusting at least one trim of said float.

4. The method as claimed in one of claims 2, or 3, wherein the step of positioning said float includes a centering of said float with respect to said support, and wherein said edifice is moved relative to the aquatic medium.

5. The method as claimed in claim 2, wherein the step of positioning includes mooring a second harpoon to said float at a distance from said first mentioned harpoon, attaching a third cable to said second harpoon, and providing said first mentioned harpoon and said second harpoon with positioning means for enabling positioning between said float and said support, and substantially simultaneously pulling on said first and third cables for bringing the float towards the support to enabling a positioning of the float relative to said support.

6. The method as claimed in claim 1, further comprising the step of rotationally indexing said arm so as to facilitate a positioning of the end of the flexible line for connection with said conduit.

7. The method as claimed in claim 1, further comprising the steps of casting off said flexible line by releasing said conduit from said end of said flexible line, and
    unmooring said float from said support whereby the edifice coupled to the bottom base can be rapidly evacuated from a critical area of the aquatic medium.

8. The method as claimed in claim 1, further comprising the step of unmooring said harpoon from said float once said float has been moored to said support.

9. The method as claimed in claim 7, wherein a plurality of flexible lines are respectively connected to a plurality of conduits, and wherein the step of casting off includes first releasing all of the flexible lines from the respective conduits and then unmooring said float from said support.

* * * * *